United States Patent [19]
Raczkowski

[11] Patent Number: 4,843,758
[45] Date of Patent: Jul. 4, 1989

[54] REGULATED AUTOMATIC PLANT WATERER

[76] Inventor: Romuald Raczkowski, 6240 N. Naper, Chicago, Ill. 60631

[21] Appl. No.: 123,714

[22] Filed: Nov. 23, 1987

[51] Int. Cl.$^4$ ............................................. A01G 27/00
[52] U.S. Cl. ......................................... 47/48.5; 47/79; 47/80
[58] Field of Search ...................... 47/79, 80, 81, 48.5, 47/82, 83

[56] References Cited

U.S. PATENT DOCUMENTS

| | | | |
|---|---|---|---|
| 3,261,125 | 7/1966 | Arkebauer | 47/81 |
| 3,293,799 | 12/1966 | Keller et al. | 47/48.5 X |
| 3,512,712 | 5/1970 | Benesch | 47/81 X |
| 3,613,309 | 10/1971 | Coburn | 47/79 |
| 4,153,380 | 5/1979 | Hartman | 47/48.5 X |
| 4,739,789 | 4/1988 | Hamilton | 47/48.5 X |

FOREIGN PATENT DOCUMENTS

| | | | |
|---|---|---|---|
| 1212409 | 3/1960 | France | 47/48.5 |
| 1259667 | 3/1961 | France | 47/48.5 |
| 568513 | 10/1975 | Switzerland | 47/48.5 |

Primary Examiner—Robert A. Hafer
Assistant Examiner—Kevin G. Rooney
Attorney, Agent, or Firm—Paul H. Gallagher

[57] ABSTRACT

A spike shaped for driving into the soil, has a vertical tube having an upturned lower portion terminating in an upwardly port. The spike has an element for connection with a water supply. It has a closer mounted at the top and its lower end adjacent the port, and restricting the port upon expanding caused by the moisture in the soil. The closer is made of wood cut across the grain in a tree limb. In a modified form, water is supplied by a jar mounted on the pot in which the plant is located. A plurality of devices may be used for a plurality of plants, supplied with water from branches of a common water line, and the device responding and controlling individually.

3 Claims, 1 Drawing Sheet

REGULATED AUTOMATIC PLANT WATERER

FIELD OF THE INVENTION

The invention relates to automatically watering plants, particularly potted plants and especially in the home. The automatic feature enables the user to give attention to the watering of the plants only at long intervals, or indefinite periods of time.

OBJECTS OF THE INVENTION

A main object of the invention is to provide a novel device and method for watering plants automatically without attention over long or indefinite periods of time.

A more specific, and more important object of the invention is to provide water to the plants automatically in accordance with the condition of moisture in the soil in which the plants are positioned.

Another object is to prove such a device that can be manually adjusted or preset to determine a maximum port opening, and corresponding and maximum rate of flow of water, whereby to supply a predetermined amount of water as desired according to the needs in the cases of different demands for water by different plants, in dry soil.

Another object is to provide such device and method of extremely simple construction and use, whereby to render the device inexpensive, and to make the use thereof extremely simple for an inexperience person.

DESCRIPTION OF A PREFERRED EMBODIMENT

Figure 1:
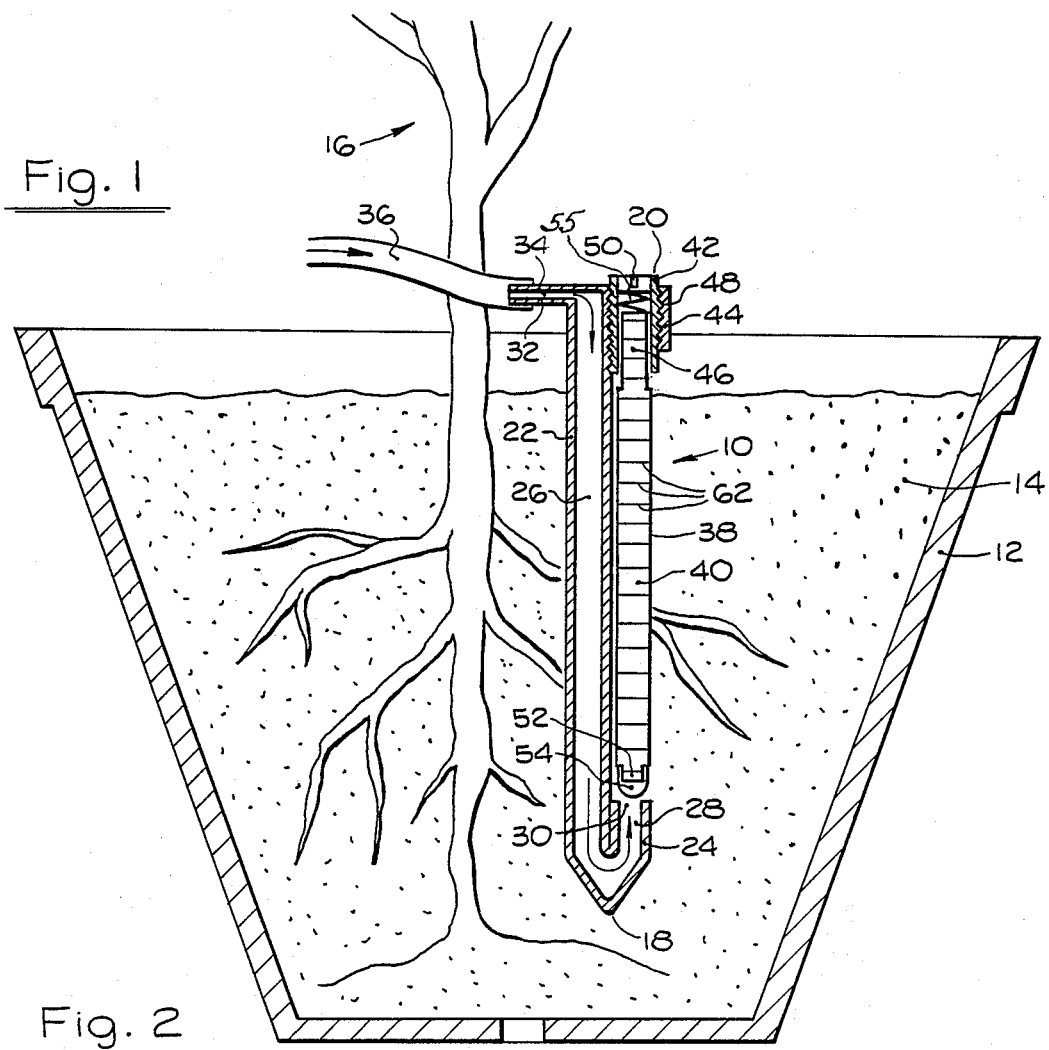
FIG. 1 is a vertical longitudinal sectional view of a pot having a plant therein, and in which the device of the invention is positioned and shown in longitudinal sectional view.

Referring in detail to the drawings, the device of the invention is indicated in its entirety at 10, and is shown in FIG. 1 in place in a pot 12 containing soil 14 in which a plant 16 is potted.

The device 10 is generally in the form of a spike or prong, which is driven into the soil by a simple manipulation of pushing it in by the hand. The spike has a lower end 18 and an upper end 20, so designated with reference to the device being disposed vertically and driven downwardly into the soil. The device in use will usually be disposed in such position, i.e. vertically, but if it should be disposed in another position, the lower end may be referred to as the inner end and the upper end as the outer end.

The spike includes a structural tubular element 22 extending substantially the length of the device and having a return bend portion 24, preferably of short length. The tubular element 22 has a main water passage 26 which extends through the return bend 24 as indicated at 28 and terminates in an upwardly directed port 30. The dimensions and proportions are such that the port 30 is preferably adjacent the lower end of the spike, and thus the water entering into the soil, so enters it toward the lower portion of the pot.

The spike includes a tubular element 32 defining an inlet passage 34 communicating with the main passage 26.

The tubular inlet element 32 is adapted for connection with a water line 36 which may be in the form of a hose leading from a suitable water supply. The water supply may be of any form providing pressure for forcing the water through the waterer device, as will be referred to again hereinbelow.

The device includes what may be referred to as a valve closer member 38, and includes a main closer element 40 preferable generally cylindrical in shape and mounted in the spike at its upper end in a sleeve 42 which is mounted in a collar 44 on the tubular member 22. The closer element 40 has an upper end portion 46 which may be of reduced dimensions, for convenience, fixedly mounted in the sleeve 42 as by friction. The sleeve 42 is exteriorly threaded at 48 and is threadedly mounted in the collar 44 which is internally threaded. The sleeve 42 also has a slot 50 in its upper exposed end surface for receiving a screw driver blade for manipulating the sleeve. The sleeve 42 may be vertically adjusted, through the threads 48, by rotating the sleeve and when it is so vertically adjusted, it carries the closer member 38 bodily therewith.

The lower end of the closer element 40 is closely adjacent the port 30 and its lower end may have a reduced dimension terminal element 52 on which is secured a resilient sealing element 54, directly engageable with the port 30, sealing the port, when the lower end of the element is forced downwardly sufficiently.

Figure 5:
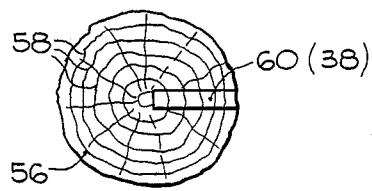
FIG. 5 is a transverse sectional view of a tree limb from which a valve closer element of the device is cut, and showing that valve closer.

The closer member 38 is of material that expands and contracts in response to a moisture condition, expanding when wetted and contracting when dry. Various kinds of material may be used for making the closer member, one such material being wood, and especially of a pine tree. FIG. 5 shows a limb 56 of such a pine tree, this figure also showing the annular rings 58 thereof. FIG. 5 also shows a slug 60 that is cut from the limb to form the closer element 38. This slug is cut transverse to the annular rings, and preferably in a radial direction, i.e. from the surface to the center. The slug thus cut is turned and shaped to the desired shape, preferably cylindrical, and the elements of the annular rings in the slug are shown at 62 in FIG. 1. The wood of the limb thus removed from the tree produces more effective expansion and contraction, transverse to the grain in the limb, as contrasted with a slug cut longitudinally from the limb.

In the use of the device, in considering a first condition in which the soil is dry, and thus also the closer element 38 is dry, the closer member 40 is manually adjusted, through turning the sleeve 42 to space the lower end of the closer element from the port 30. Water is then ejected through line 36, and thus through the passages 34, 26, 28, and out the port into the soil. As this water flow continues, the water in the soil moves or migrates to all portions of the soil, and comes in contact with the closer element 38, and the latter, upon becoming wet from the moisture in the soil, expands and pushes the lower end downwardly, progressively so, and progressively restricting the port 30. Upon continued expansion of the element 38, the sealing element 54 engages the port and completely seals it. The element 54 is preferably resilient so as to accommodate a certain degree of overrun of the closer element. Also, a spring 55 is provided for accommodating unusually great amounts of overrun.

As the amount of moisture in the soil decreases, through migration into the plant and evaporation into the atmosphere, the soil correspondingly dries, and the closer element 38 of course dries, and it contracts a corresponding amount and the lower end is lifted off of the port 30. This permits the water to enter into the soil, and due to delay in the water that enters into the soil, reaching the element 38, the lower end continues to move further from the port and to permit more water to flow therethrough, until the water again saturates the soil sufficiently to reach the closer element and again expand it in closing direction.

Figure 2:
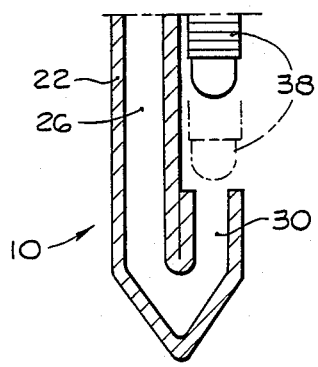
FIG. 2 is a fragmentary view of the lower end portion of the watering device shown in FIG. 1.

The device accommodates various rates of water flow, that may be required under different circumstances. Larger plants may require more water than smaller plants, the condition of the soil may require more or less, respectively, moisture, and heat conditions may produce faster or slower evaporation, etc., and in order to thus accommodate different rates of flow, the closer member 38 may be adjusted to any of various positions for permitting maximum water flow, in each instance. Reference is made to FIG. 2 showing the lower end of the closer element 38 in a relatively high position, shown in solid lines, and in a relatively low position, shown in dot-dash lines. In the first case a wide opening is pivoted for flow of water, while in the second case the effective opening is reduced for restricting the flow. The relationship in this figure is exaggerated. These starting positions as represented in FIG. 2 represent a dry condition, in which the size of the opening can be as desired, as contrasted with a wet condition in which the position of the element 38 would be at different positions at different conditions of moisture.

Figure 3:
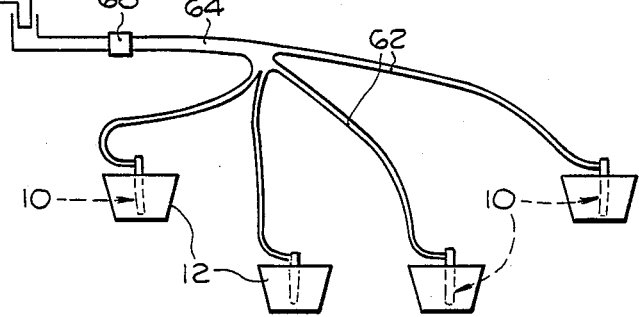
FIG. 3 is a semi-diagrammatic view of a plurality of the devices, connected with a common source of water supply, and associated with a corresponding number of potted plants.

FIG. 3 shows an arrangement of a plurality of pots 12 and the waterer devices 10 shown in dot-dash lines therein. The devices 10 are connected with branches 62 from a main water line 64 corresponding with the water line 36 in FIG. 1. The water may be derived from a hydrant 66, but in this case a water pressure reducer 68 may be utilized, since the pressure desired for use of the device is very minimal. Each of the waterers 10 responds to the condition of moisture in the respective pot, of course independently of all the others, and because of that feature, each plant is watered according to its own needs, such as whether it is a small or large plant, or of a certain kind of soil, etc. Also, the waterers 10 may be individually adjusted, as represented in FIG. 2, to a large opening or small opening, according to the requirements of the respective plants.

Figure 4:
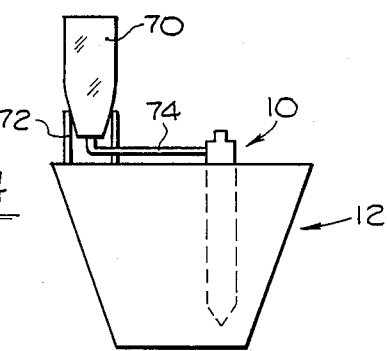
FIG. 4 is a semi-diagrammatic view of a modified form of device.

FIG. 4 shows the use of the device in connection with a localized source of water, such as a bottle 70, mounted in a stand or housing 72 mounted on the pot 12. A water line 74 leads from the bottle 70 to the device 10. In this case, FIG. 4, water is fed by gravity to the device 10.

If desired, fertilizer can be put in the water, and the use of the term water herein may include fertilizer.

I claim:

1. A plant waterer comprising:
   a spike having an upper end and a lower end and adapted to be driven into the soil in which the plant is positioned,
   the spike including a tubular element having a main member extending substantially the length of the spike and having a relatively short return bend at its lower end, the terminal end of the return bend being positioned closely adjacent the lower end of the spike,
   the tubular element having a passage therethrough including an inlet pasasge at its upper end leading to a main passage that terminates in a port at the upper end of the return bend, and
   closure means including a closure element secured adjacent its own upper end to the tubular element at a point adjacent the upper end of the latter, and extending downwardly in longitudinal alignment with the port and extending into close proximity thereto,
   the closure element being positioned on the exterior of the tubular element and thereby being exposed nearly throughout its length to engagement thereof by the soil,
   the closure element being sensitive to water and expandable and retractable respectively in response to increase and decrease of moisture in the soil, and being operable in response to expansion thereof for restricting the port, and in response to expansion thereof to a predetermined amount, for closing the port.

2. A plant waterer according to claim 1 wherein,
   the closure element being contained essentially within the longitudinal projection of the return bend, and
   the spike having a pointed lower end extending essentially throughout the transverse extent of the spike.

3. A plant waterer according to claim 1 wherein,
   the closure element is constituted by wood formed from a slug cut from a limb of a tree in direction substantially radially of the limb.

* * * * *